United States Patent [19]

Tauber

[11] Patent Number: 4,978,087
[45] Date of Patent: Dec. 18, 1990

[54] ACCELERATION SENSOR FOR VEHICLE-SENSITIVE SYSTEMS

[75] Inventor: Erhard Tauber, Munich, Fed. Rep. of Germany

[73] Assignee: Britax-Kolb GmbH & Co., Dachau, Fed. Rep. of Germany

[21] Appl. No.: 267,798

[22] Filed: Nov. 7, 1988

[30] Foreign Application Priority Data

Nov. 10, 1987 [DE] Fed. Rep. of Germany ....... 3738200

[51] Int. Cl.$^5$ .............................................. B60R 22/40
[52] U.S. Cl. ............................................... 242/107.4 A
[58] Field of Search ................ 242/107.4 A; 297/478, 297/480; 280/806

[56] References Cited

U.S. PATENT DOCUMENTS

| | | | |
|---|---|---|---|
| 4,046,332 | 9/1977 | Wheeler et al. | 242/107.4 A |
| 4,050,644 | 9/1977 | Fohl | 242/107.4 A |
| 4,063,695 | 12/1977 | Oshikawa | 242/107.4 A |
| 4,069,988 | 1/1978 | Pouget | 242/107.4 A |
| 4,077,584 | 3/1978 | Lafont | 242/107.4 A |
| 4,343,444 | 8/1982 | Francis | 297/478 X |
| 4,401,282 | 8/1983 | Miki | 242/107.4 A |
| 4,467,981 | 8/1984 | Mori et al. | 242/107.4 A |
| 4,522,350 | 6/1985 | Ernst | 242/107.4 A |
| 4,610,480 | 9/1986 | Yamada et al. | 242/107.4 A X |

FOREIGN PATENT DOCUMENTS

| | | |
|---|---|---|
| 0112033 | 6/1984 | European Pat. Off. . |
| 2658747 | 6/1978 | Fed. Rep. of Germany . |
| 8503441 | 2/1987 | Fed. Rep. of Germany . |
| 52-20524 | 2/1977 | Japan ..................... 297/478 |
| 1599186 | 9/1981 | United Kingdom . |
| 1599187 | 9/1981 | United Kingdom . |
| 1599188 | 9/1981 | United Kingdom . |

*Primary Examiner*—John M. Jillions
*Attorney, Agent, or Firm*—Morgan & Finnegan

[57] ABSTRACT

An acceleration sensor for vehicle-sensitive systems is mounted on a part connected to the vehicle and comprises a mounting part having a baseplate, which has a spherical socket-shaped recess and bearing means for an impulse lever, which between the tip thereof and the part thereof mounted in the bearing means is enlarged to form a spherical socket-shaped cap. A ball which constitutes an inertia mass is provided between the cap and the socket-shaped recess and an actuating member, which preferably consists of a control pawl which is in contact, or almost in contact, with the tip of the impulse lever and is activated by the tip thereof as the ball is moved out of its position of rest by accelerations having predetermined values. The mounting part is directly or indirectly pivoted to a pivoted part of the vehicle, such as a seat or the rest of a seat, on an axis which extends through the region in which the tip of the impulse lever contacts the actuating member. The mounting part is provided with a position control drive, which in response to a pivotal movement of the pivoted part of the vehicle imparts to the mounting part a pivotal movement such that the baseplate remains in a substantially horizontal position.

15 Claims, 4 Drawing Sheets

ACCELERATION SENSOR FOR VEHICLE-SENSITIVE SYSTEMS

BACKGROUND OF THE INVENTION

1. Field of the Invention

This invention relates to an acceleration sensor for vehicle-sensitive systems which is mounted on a part connected to the vehicle and comprises a mounting part having a baseplate, which has a spherical socket-shaped recess and bearing means for an impulse lever, which between the tip thereof and the part thereof mounted in the bearing means is enlarged to form a spherical socket-shaped cap. A ball which constitutes an inert; a mass is provided between the cap and the socket-shaped recess and an actuating member, which preferably consists of a control pawl which is in contact, or almost in contact with the tip of the impulse lever and is activated by the tip thereof as the ball is moved out of its position of rest by accelerations having predetermined values.

2. Description of the Prior Art

Such an acceleration sensor which is connected to a belt retractor is known from Published German Application 34 18 378. A satisfactory function of such acceleration sensor is ensured unless the baseplate of the mounting part for the ball is in a horizontal, or substantially horizontal, position. The acceleration sensor is usually adjusted to respond to accelerations in excess of 0.5 g. When the baseplate of the mounting part of the acceleration sensor assumes an inclined position, the ball will shift from its position of rest and the impulse lever will actuate the control pawl so that it enters between teeth of a control wheel and the belt retractor will thus be blocked.

If the acceleration sensor is connected to a part which is fixed to the vehicle and does not change its position relative to the vehicle, the baseplate of the mounting part will always remain in its predetermined horizontal basic position. However, if the belt retractor is installed, for instance, in the backrest of a seat of the vehicle and the position of the backrest is changed, the acceleration sensor will not be operable unless the baseplate of the mounting part is readjusted to a horizontal position.

German Patent Specification 26 58 747 discloses a seat belt system which is integrated in a seat, or a rest of a seat, of a motor vehicle and which, after a change of the position of the seat, or of the rest of the seat, can be adapted to the new position since the belt retractor provided with the acceleration sensor is mounted on a pivoted carrying plate, which through linkages consisting of levers and rods and/or Bowden cables can be pivotally moved to a position in which the vertical axis of the vehicle-sensitive blocking means is held in the direction of acceleration which is due to gravity. However, such known seat belt system involves a high expenditure because extensive adjusting and linkage means must be provided, which after any change of position of the seat or rest adjust the belt retractor provided with the acceleration sensor and in any adjusted position fix the belt retractor, so that it can take up the forces exerted by the belt.

From German Utility Model Specification 85 03 541 it is known per se to provide a belt retractor which is provided with an acceleration sensor which is secured to a seat of a vehicle and to adjust only the acceleration sensor rather than the entire belt retractor after a change of position of the seat. In such known adjusting mechanism, the lever which is described as an impulse lever directly constitutes a blocking lever for the control wheel so that when the blocking lever is actuated by the ball the tip of the lever will directly enter between teeth of a control wheel to block the same. However, because in the known apparatus the pivotal axis of the mounting part does not extend through the region of the tip of the blocking lever, any adjustment of the mounting part displaces the tip of the blocking lever relative to the teeth of the control wheel, so that an unchanged reliable movement of the blocking lever to a position between the teeth of the control wheel will no longer be ensured after a change of position.

SUMMARY OF THE INVENTION

It is an object of the present invention to provide an acceleration sensor of the kind described first hereinbefore which can be adjusted in response to pivotal movements in a simple and reliable manner, while the position of the entire belt retractor need not be adjusted after a change of the position of the seat, or of a rest of the seat.

In an acceleration sensor of the kind described first hereinbefore that object is accomplished in accordance with the invention by providing a mounting part which is directly or indirectly, pivoted to a pivoted part of the vehicle, such as a seat, or a rest of a seat, on an axis which extends through the region in which the tip of the impulse lever contacts the actuating member, the mounting part being provided with a position control drive, which, in response to a pivotal movement of the part of the vehicle, imparts to the mounting part a pivotal movement such that the baseplate remains in its substantially horizontal position. If an acceleration sensor of the kind described first hereinbefore is to remain operative, it is necessary that a pivotal movement of the sensor cause the baseplate of its mounting part to remain in a horizontal position and the position of the impulse lever relative to the actuating member not be changed by a pivotal movement since, otherwise, an actuation activating the safety belt system would no longer be ensured.

In the acceleration sensor in accordance with the invention the pivotal axis of the mounting part extends through the region in which the tip of the impulse lever contacts the actuating member, so that the relative association of these two parts is maintained during any pivotal movement. For this reason, it will be sufficient to ensure that a pivotal movement of the acceleration sensor will cause the mounting part to perform such a compensating pivotal movement that its baseplate remains in its horizontal position. Such compensating pivotal movement will not change the position of the tip of the impulse lever relative to the actuating member. In accordance with the invention, the acceleration sensor is merely adjusted to a new position after a pivotal movement of the pivoted part of the vehicle, whereas the belt retractor need not be adjusted at all; the stability of the belt retractor will not be adversely affected by the change in position and a simple adjustment and high functional reliability will be ensured.

Protection is also claimed for an embodiment of an acceleration sensor of the kind known from German Utility Model Specification 85 03 541 in which an actuating member, preferably consisting of a control pawl, is not provided and the impulse lever itself constitutes a blocking lever which serves to block a control wheel or the like and which directly enters between teeth of the control wheel. In such a sensor, the invention resides in the fact that the pivotal axis of the mounting part for the blocking lever extends through the region of the tip of the blocking lever. In such an embodiment, a pivotal movement of the mounting part, as a result of a change of the position of the seat, or the seat rest, or the like, results only in a shifting of the pivotal axis of the blocking lever, but will not result also in a shifting of the wheel-blocking tip, so that the function of the acceleration sensor will not adversely be affected by its adjustment in adaptation to a change in position.

The pivoted part of the vehicle will perform pivotal movements on a plurality of axes only in exceptional cases. In such a case, the pivotal axis of the mounting part may be constituted by the instantaneous axis of a universal joint.

The acceleration sensor normally consists of the vehicle-sensitive system of a belt retractor and the pivotal axis of the mounting part will suitably be secured to a leg of the U-shaped frame.

In accordance with a further feature of the invention pivotal movement is imparted to the mounting part by a screw mechanism, the operation of which is derived from the position control drive for changing the position of the pivoted part of the vehicle. As a rule, in such arrangement, the pivoted part of the vehicle consists of a vehicle seat or a backrest. If an electric drive is provided for changing the position of such part of the vehicle, the operation of the screw mechanism may be derived via a flexible shaft.

In accordance with such a preferred feature, the nut of the screw mechanism is articulatedly connected to the mounting part or the baseplate, the screw is rotatably and axially non-displaceably mounted in a bearing member, which is directly or indirectly rotatably mounted on the pivoted part of the vehicle, and the pivotal axes of the nut of the screw mechanism, of the mounting part and of the bearing member are parallel to each other. With such a design the movement of the mounting part of the acceleration sensor along an arc of a circle is transformed in a simple manner to a straight-line movement of the nut of the screw mechanism relative to the bearing member.

In a further embodiment of the invention, a screw is in threaded engagement with a nut, or with female screw threads, which are fixedly and directly or indirectly connected to the pivoted part of the vehicle, the shank of the screw is provided close to its free end with two spaced apart retaining discs, between which the legs of a forked member extend to straddle the shank, the forked member is pivoted to the mounting member on an axis which is parallel to its pivotal axis, and the operation of the screw is derived, preferably via a flexible shaft, from the position control drive for changing the position of the pivoted part of the vehicle.

In accordance with a final embodiment of the invention, a worm is directly or indirectly movably mounted on the pivoted part of the vehicle and in mesh with a worm wheel segment which is fixedly connected to the mounting part and has a central axis which coincides with the pivotal axis, and the operation of the worm is derived, preferably, via a flexible shaft, from the position control drive for changing the position of the pivoted part of the vehicle.

DETAILED DESCRIPTION OF THE PREFERRED EMBODIMENTS

Figure 1:
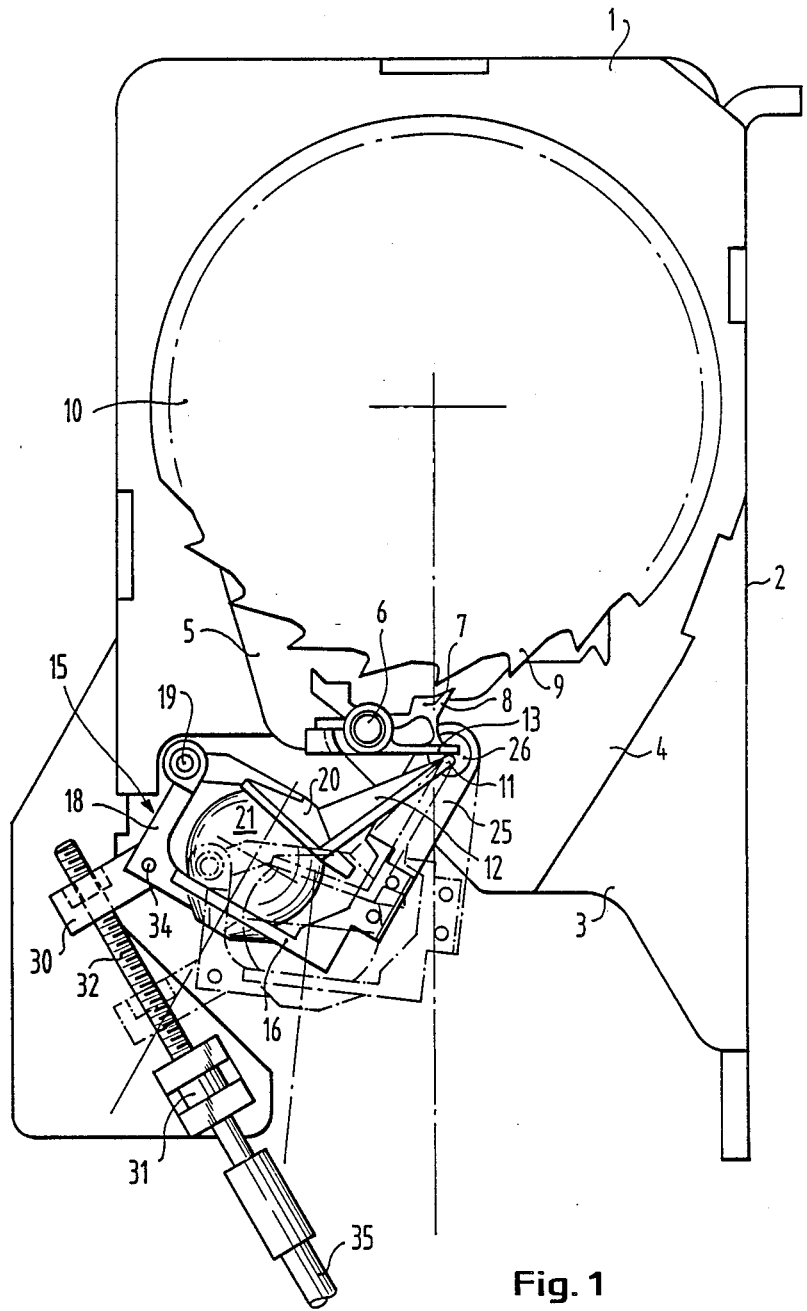
FIG. 1 is a side elevation showing a belt retractor provided with a vehicle-sensitive pivoted acceleration sensor.
Figure 2:
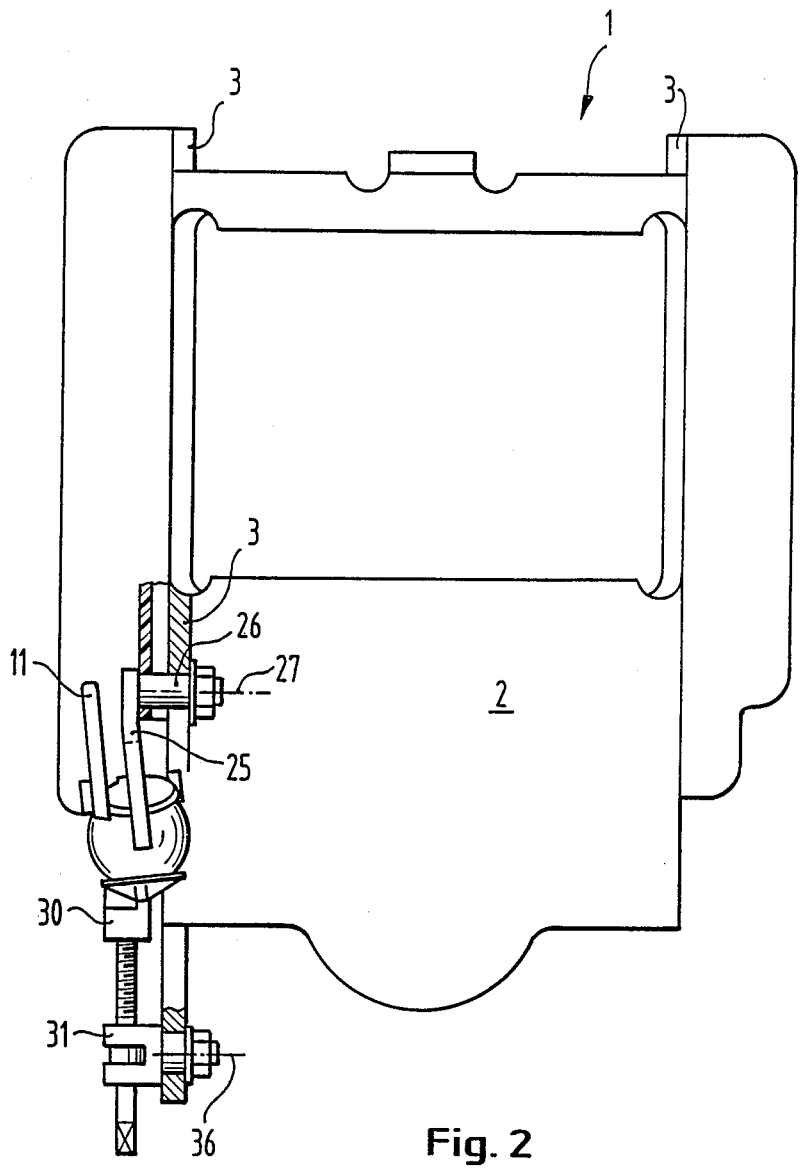
FIG. 2 is a side elevation showing the belt retractor of FIG. 1.

The belt retractor shown in FIGS. 1 and 2 comprises a U-shaped base frame 1 having a central crosspiece 2 and laterally disposed parallel legs 3. The belt retractor is secured to a pivoted backrest by the frame. A reel is movably mounted in the frame 1 by special bearing members. Baseplate 4 of plastic is connected to one leg 2 of the frame. A control disk 5 is pivoted to the baseplate 4. A two-armed pawl lever 7 is pivoted on a pin 6 of the control disk 5 and has a locking tooth 8 for entering between teeth 9 of the control wheel 10 as the impulse lever 12 performs a pivotal movement causing its tip 11 to slide on actuating member 13 of control pawl 7, so that the latter is pivotally moved to enter between teeth 9. Control wheel 10 is connected to the shaft of the reel.

The vehicle-sensitive acceleration sensor 15 consists of a baseplate 16, which has a spherical socketlike recess, and impulse lever 12, which is pivoted by the pivot 19 to the bearing member 18, which is connected to the baseplate 16. The impulse lever 12 is provided with a spherical socketlike cap 20 between the bearing for the lever and its tip 11. The sensor ball 21 is held between that cap and the recess in the baseplate 16.

In so far as the belt retractor and the vehicle-sensitive acceleration sensor 15 have been described thus far, they correspond to the device described in Published German Application 34 18 378, which is incorporated herein by reference as far as further details are concerned.

The differences from the known belt retractor will now be described:

The baseplate 16 is fixedly connected to a mounting part, which at its free top end is provided with a pivot pin 26, which is pivoted in the leg 3 of the frame 1. The pivotal axis 27 of the carrying member 25 extends through the point of contact between the tip 11 of the impulse lever 12 and the actuating portion 13 of the control pawl 7.

At the end opposite to the pivot pin 26, the baseplate 16, or the mounting part 25, is articulatedly connected to a nut 30 of a screw mechanism which comprises a screw 32 that is screwed into nut 30. Screw 32 is freely rotatably and axially undisplaceably mounted in the bearing member 31, which is mounted on an extension of the leg 3 for rotation on a pivot 36, which is at a right angle to the screw 32. Nut 30 is articulatedly connected by the pivot pin 34 to the mounting part 25 or the baseplate 16. Due to the articulated mounting of nut 30 and the rotatable mounting of the bearing member 31, rotation of the screw 32 will cause the nut and the bearing member 31 to perform a straightline movement relative to each other so that the arcuate movement performed by the pivot pin 34 during a pivotal movement of the acceleration sensor will be compensated.

Screw 32 is connected at its bottom end to a flexible shaft 35, so that rotation of the shaft will rotate the screw and impart a pivotal movement about axis 27 of pivot pin 26 to the baseplate 16.

The belt retractor or automatic belt retractor has been installed in a pivoted rest of a seat. The position of the rest is changed by a servomotor provided with a transmission.

A transmission for driving the flexible drive shaft is interposed between the drive motor and the transmission for changing the position of the rest of the seat. That interposed transmission may be a worm and worm wheel gear train or a pinion and spur gear train or a bevel gear train.

The rotation of the servomotor is transmitted by shaft 35 to screw 32 at a predetermined ratio relative to the change of the angular position of the seat rest so that the baseplate 16 will be readjusted in dependence on the adjustment of the seat rest. As a result, the baseplate will be maintained in its horizontal position relative to a change of position of the seat rest.

As has already been described, the pivotal axis of the acceleration sensor extends through the tip of the impulse lever, so that the point where the impulse lever engages the actuating member will not be changed.

The means for adjusting the sensor consists of a screw-nut mechanism. Depending on the sense of rotation of the flexible shaft 35, that is, depending on the direction in which the position of the seat rest is changed, the sensor will be pivotally raised or lowered so that its angular position will be changed in synchronism with the change of the position of the seat rest.

The levers in which the nuts are located are mounted on the side opposite to the side on which the sensor is mounted.

In order to transform the movement of the acceleration sensor along an arc of a circle to a straight-line movement of the nut on the screw threads, nut 30 is directly connected to the baseplate 16, or is pivoted thereto by a lever and the pivot pin 34. Nut 30, or a lever holding nut 30, and the bearing member 31, are held parallel to each other because both parts are pivoted.

The arrangement described hereinbefore permits automatic adjustment of the acceleration sensor dependent on a change of position of the seat rest. The arrangement is inexpensive and compact and the screw mechanism ensures an exact adjustment of the sensor.

Figure 3:
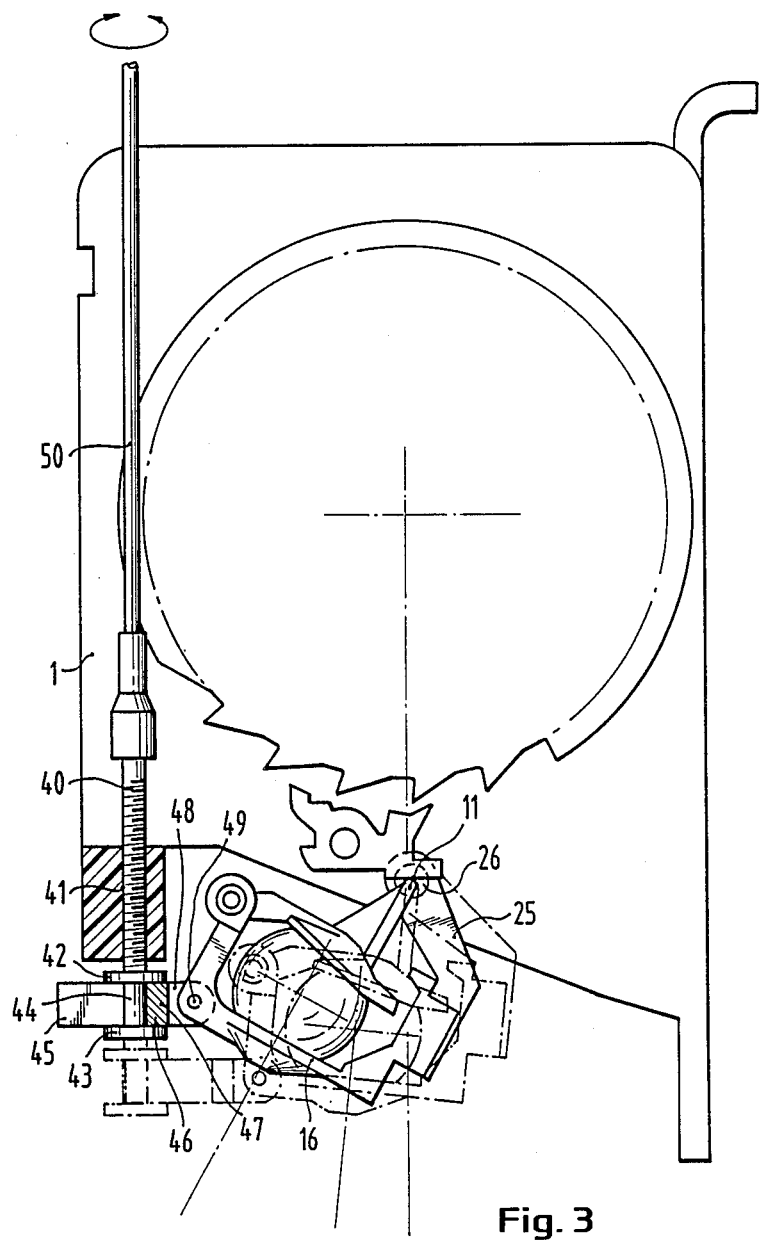
FIG. 3 is a side elevation showing a second embodiment of a belt retractor comprising an adjusting device comprising a screw and a forked member serving to adjust the acceleration sensor.

In the embodiment shown in FIG. 3, the screw 40 is screwed into female screw threads 41, which are fixedly secured to the base frame 1. At the end which extends through screw threads 41, screw 40 carries two spaced apart annular disks 42 and 43, between which a threadless shank 44 is disposed and which is straddled by two legs 45 of a forked member 46. The legs 45 are rectangular in cross-section and the top and bottom surfaces thereof constitute sliding surface, which are transversely slidably guided between the confronting faces of the disks 42 and 43. The surfaces constitute guides for the legs 45 of the forked member. The crosspiece 47 of the forked member is provided with an extension 48 which is pivoted by pivot pin 49 to the base part 16, as is illustrated. Upon rotation of the screw 40 by the shaft 50, the forked member 46 is adjusted parallel to itself and by such adjusting movement the base part 16 of the acceleration sensor is pivotally moved. The pivotal movement of the pivot pin 49 along an arc of a circle is compensated for since the legs 45 of the forked member 46 are held between the disks 42 and 43 so as to be capable of a transverse displacement. In FIG. 3 the forked member 46 is shown in solid lines in an upper position and in dotted lines in a lower position. The mounting member 25 is again pivoted on the pivot pin 26 which has a center line extending through the region of the tip 11 of the sensor lever 12.

Figure 4:
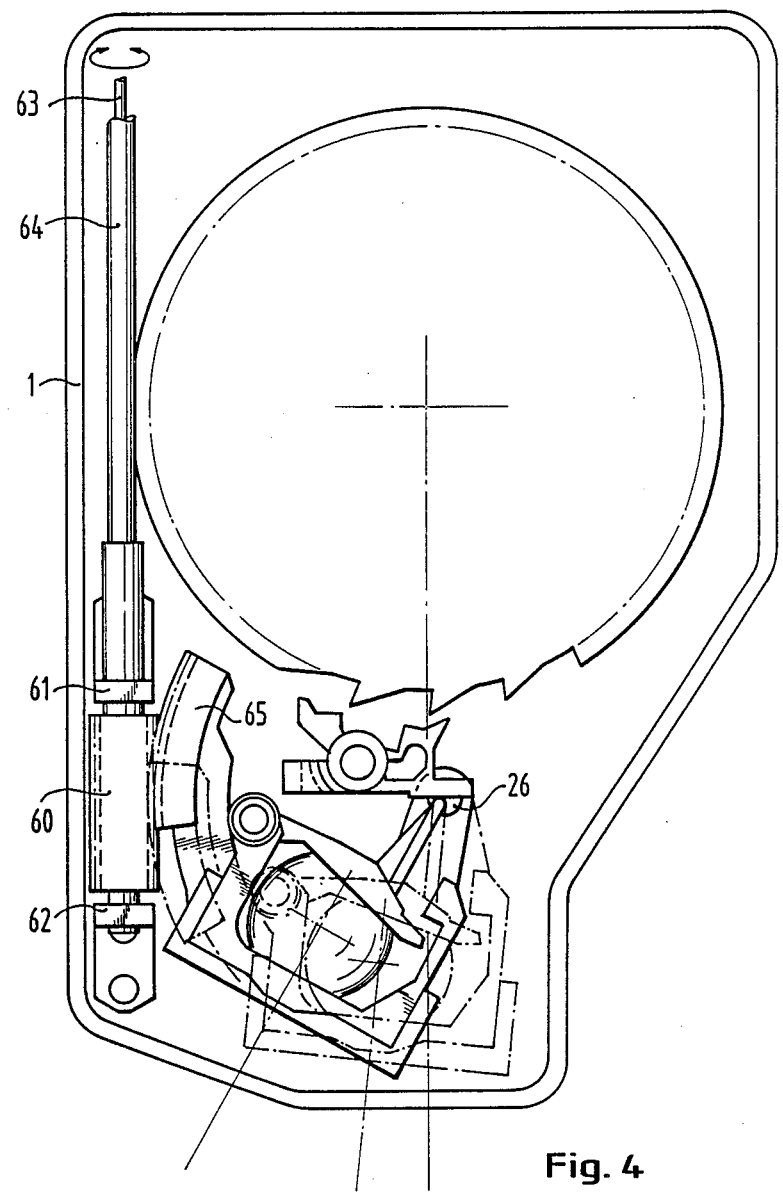
FIG. 4 is a side elevation showing a third embodiment of an acceleration sensor which is pivotally movable by a worm gear train.

In the embodiment shown in FIG. 4, a worm 60 is rotatably mounted in bearing members 61, 62 carried by the base frame 1. Rotation is imparted to the worm 60 by a flexible shaft 63, which extends in a flexible tube 64 and which may consist of a helical wire surrounded by a protective sheath. The worm 60 meshes with a worm wheel segment 65, which is connected to the mounting member 25. The imaginary central axis of the worm wheel segment 65 coincides with the axis 27 of the pivot pin 26, so that rotation of the worm 60 will impart to the acceleration sensor a pivotal movement about the pivot pin 26.

I claim:

1. An acceleration sensor for vehicle-sensitive systems which is attached to a part connected to a vehicle and comprises a mounting part including a baseplate provided with a spherical socket-shaped recess and bearing means, an impulse lever mounted in said bearing means, said impulse lever being enlarged between the tip thereof and the part thereof mounted in said bearing means and forming a spherical socket-shaped cap, a ball which constitutes an inertia mass located between said cap and said socket-shaped recess, and actuating member consisting of a control pawl located in the vicinity of the tip of said impulse lever and activated by the tip of said impulse lever when said ball is moved out of its position of rest by accelerations having predetermined values, said mounting part being pivoted to a pivoted part of said vehicle on an axis extending through the region in which the tip of said impulse lever contacts said actuating member, and said mounting part being provided with a position control drive responsive to a pivotal movement of said pivoted part of said vehicle said sensor further comprising a screw mechanism attached to the baseplate of the mounting part and to the position control drive through a flexible shaft, said screw mechanism imparting pivotal movement to said mounting part, and movable by changes in the position of the pivoted part of the vehicle, and retaining said baseplate in a substantially horizontal position.

2. An acceleration sensor according to claim 1, wherein the mounting part and the pivoted part of the vehicle are connected to each other by a joint and the axis extending through the region in which the tip of the impulse lever contacts the actuating member is constituted by the axis of said joint.

3. An acceleration sensor according to claim 1 in combination with a belt retractor having a U-shaped frame provided with legs and the pivotal axis of said sensor is defined by a pivot pin secured to a leg of said U-shaped frame of said belt retractor.

4. An acceleration sensor according to claim 1, wherein the nut of the screw mechanism is articulatedly connected to the baseplate of the mounting part, the screw of said screw mechanism being rotatably and axially non-displaceably mounted in a bearing member which is rotatably mounted on the pivoted part of the vehicle, and the pivotal axis of said nut, said mounting part and said bearing member being parallel to each other.

5. In combination, a belt retractor and an acceleration sensor according to claim 1.

6. An acceleration sensor for vehicle-sensitive systems which is attached to a part connected to a vehicle and comprises a mounting part, including a base plate provided with a spherical socket-shaped recess and bearing means, an impulse lever mounted in said bearing means, said impulse lever being enlarged between the tip thereof and the part thereof mounted in said bearing means and forming a spherical socket-shaped cap, a ball which constitutes an inertia mass located between said cap and said socket-shaped recess, and an actuating member consisting of a control pawl located in the vicinity of the tip of said impulse lever and activated by the tip of said impulse lever when said ball is moved out of its position of rest by accelerations having predetermined values, said mounting part being pivoted to a pivoted part of said vehicle on an axis extending through the region in which the tip of said impulse lever contacts said actuating member, and said mounting part being provided with a position control drive responsive to a pivotal movement of said pivoted part of said vehicle, said sensor further comprising a screw having a shank, said screw threadably engaged with a nut or female screw threads fixedly connected to the pivoted part of the vehicle, the shank of said screw being provided close to its free end with two spaced apart retaining discs, a forked member provided with legs disposed between said discs with said legs straddling said shank, said forked member being pivoted to the mounting part on an axis parallel to its pivotal axis, and said screw being connected through a flexible shaft to the position control drive and movable by changes in the position of the pivoted part of the vehicle, imparting to said mounting part a pivotal movement and retaining said baseplate in a substantially horizontal position.

7. An acceleration sensor for vehicle-sensitive systems which is attached to a part connected to a vehicle and comprises a mounting part including a base plate provided with a spherical socket-shaped recess and bearing means, an impulse lever mounted in said bearing means, said impulse lever being enlarged between the tip thereof and the part thereof mounted in said bearing means and forming a spherical socket-shaped cap, a ball which constitutes an inertia mass located between said cap and said socket-shaped recess, and an actuating member consisting of a control pawl located in the vicinity of the tip of said impulse lever and activated by the tip of said impulse lever when said ball is moved out of its position of rest by accelerations having predetermined values, said mounting part being pivoted to a pivoted part of said vehicle on an axis extending through the region in which the tip of said impulse lever contacts said actuating member, and said mounting part being provided with a position control drive responsive to a pivotal movement of said pivoted part of said vehicle, said sensor further comprising a worm movably mounted on the pivoted part of the vehicle and in mesh with a worm wheel segment fixedly connected to the mounting part, said worm segment having a central axis which coincides with the pivotal axis of said mounting part, said worm being connected by a flexible shaft to the position control drive and movable by changes in the position of the pivoted part of the vehicle, imparting to said mounting part a pivotal movement and retaining said baseplate in a substantially horizontal position.

8. An acceleration sensor for vehicle-sensitive systems which is attached to a part connected to a vehicle and comprises a mounting part having a baseplate provided with a spherical socket-shaped recess and bearing means, an impulse lever mounted on said bearing means said impulse lever being enlarged between the tip thereof and the part thereof mounted in said bearing means and forming a spherical socket-shaped cap, a ball which constitutes an inertia mass located between said cap and said socket-shaped recess, and an actuating member consisting of a control pawl located in the vicinity of the tip of said impulse lever and activated by the tip of said impulse lever when said ball is moved out of its position of rest by accelerations having predetermined values, and a screw mechanism attached to said baseplate and to a position control drive through a flexible shaft, said screw mechanism imparting pivotal movement to said mounting part and movable by changes in the position of the pivoted part of the vehicle.

9. In combination, a belt retractor and an acceleration sensor according to claim 8.

10. An acceleration sensor for vehicle-sensitive systems which is attached to a part connected to a vehicle and comprises a mounting part having a baseplate provided with a spherical socket-shaped recess and bearing means, an impulse lever mounted in said bearing means, said impulse lever being enlarged between the tip thereof and the part thereof mounted in said bearing means and forming a spherical socket-shaped cap, a ball which constitutes an inertia mass located between said cap and said socket shaped recess, and an actuating member consisting of a control pawl located in the vicinity of the tip of said impulse lever and activated by the tip of said impulse lever when said ball is moved out of its position of rest by accelerations having predetermined values, and a screw having a shank, said screw threadably engaged with a nut or female screw threads fixedly connected to the pivoted part of the vehicle, the shank of said screw being provided close to its free end with two spaced apart retaining discs, a forked member provided with legs disposed between said discs with said legs straddling said shank, said forked member being pivoted to the mounting part on an axis parallel to its pivotal axis, and said screw being connect through a flexible shaft to a position control drive and movable by changes in the position of the pivoted part of the vehicle.

11. In combination, a belt retractor and an acceleration sensor according to claim 10.

12. An acceleration sensor for vehicle sensitive systems which is attached to a part connected to a vehicle and comprises a mounting part having a baseplate provided with a spherical socket-shaped recess and bearing means, an impulse lever mounted in said bearing means, said impulse lever being enlarged between the tip thereof and the part thereof mounted in said bearing means and forming a spherical socket-shaped cap, a ball which constitutes an inertia mass located between said cap and said socket-shaped recess, and an actuating member consisting of a control pawl located in the vicinity of the tip of said impulse lever and activated by the tip of said impulse lever when said ball is moved out of its position of rest by accelerations having predetermined values, a worm movably mounted on the pivoted part of the vehicle and in mesh with a worm wheel segment fixedly connected to the mounting part, said worm wheel segment having a central axis which coincides with the pivotal axis of said mounting part, and said worm being connected by a flexible shaft to the position control drive and moveable by changes in the position of the pivoted part of the vehicle.

13. In combination, a belt retractor and an acceleration sensor according to claim 12.

14. An acceleration sensor for vehicle sensitive systems which is attached to a part connected to a vehicle and comprises a base frame, a mounting part and a blocking lever with a tip, said mounting part having a baseplate provided with a spherical socket-shaped recess and bearing means, and which turns on a pivotal axis extending through the region of the tip of said blocking lever, an impulse lever mounted on said bearing means, said impulse lever being enlarged between the tip thereof and the part thereof mounted in said bearing means and forming a spherical socket-shaped cap, a ball which constitutes an inertia mass located between said cap and said socket-shaped recess and a control pawl provided with a tip, said impulse lever constituting with said control pawl said blocking lever, the tip of said control pawl being arranged to enter between teeth of a control wheel connected to said base frame when said ball is moved out of its position of rest by accelerations having predetermined values.

15. In combination, a belt retractor and an acceleration sensor according to claim 14.

* * * * *

UNITED STATES PATENT AND TRADEMARK OFFICE
CERTIFICATE OF CORRECTION

PATENT NO. : 4,978,087

DATED : December 18, 1990

INVENTOR(S) : Erhard Tauber

It is certified that error appears in the above-identified patent and that said Letters Patent is hereby corrected as shown below:

On the Title Page of the Patent, the name of the Assignee "Britax-Kolb" should read --Autoliv-Kolb--.

Signed and Sealed this

Second Day of June, 1992

Attest:

DOUGLAS B. COMER

Attesting Officer

Acting Commissioner of Patents and Trademarks